United States Patent Office 2,798,001
Patented July 2, 1957

2,798,001

MOLD COATING COMPOSITION

Thomas M. O'Neil, La Grange, Ill., and Walter P. Green, Jr., Laurel, Miss., assignors to Masonite Corporation, a corporation of Delaware No Drawing. Application February 26, 1953,
Serial No. 339,172

8 Claims. (Cl. 106—38.23)

The present invention relates to the art of casting metals and relates particularly to the preparation of coating compositions suitable for protecting the surfaces of metal mold cavities. Even more particularly, the invention relates to the preparation of mold coating compositions from the water-soluble material obtained from thermally hydrolyzed lignocellulose and to the coating of mold cavity surfaces therewith.

It is well known that, in the pouring of high melting point metals such as steel and the like, the surfaces of the castings are usually rough and irregular and that considerable expense is involved in cleaning the surfaces of the rough castings. Much of the expense involved arises from the necessity for milling, scarfing, and the like of the casting surfaces and from the loss of metal as a consequence thereof. Accordingly, many efforts have been made to provide a coating on the inner surfaces of the metal molds employed in the art with the intention thereby of preventing splashing of the molten metal and of obtaining cast articles having smoother and more regular surfaces. Some of the prior art coatings have been somewhat successfully employed. However, many of the coating compositions have been undesirable due to the toxic and nauseous gases emitted thereby during use.

It is a primary object of the present invention to provide an improved mold coating composition suitable for use in the casting of high melting point metals.

It is a further object of the invention to provide an improved mold coating composition prepared from the water-soluble material obtained from thermally hydrolyzed lignocellulose.

Another object of the invention resides in the provision of such a mold coating composition characterized by its freedom from emission of undesirable gases during use. Other objects of the invention will be apparent from the following description thereof.

In the manufacture of lignocellulose fiber boards, wood, woody materials obtained from corn stalks, cane, and other vegetable growths may be subjected to fibration and varying degrees of hydrolysis by treatment with steam. One such method is described in United States Patent No. 1,824,221 to Mason, issued September 22, 1931. In this method, relatively small wood chips are subjected to pressures of about 200–1200 p. s. i. at temperatures of about 200°–300° C. for approximately 30 seconds to 5 seconds, respectively, in the presence of steam. The woody material is then discharged from the treatment chamber through a constricted opening into a zone of lower pressure, thereby exploding the wood chips into comparatively finely divided elongated fibers and bundles of fibers. This thermohydrolytic treatment renders a portion of the wood water soluble while other fractions thereof become dispersible or suspendible in water. The water solubles, including those materials suspended or dispersed, are composed substantially of about 60–80% of hexosans and pentosans, 5–25% of lignin, 5–15% of non-sugar carbohydrates, and 2–8% of gums. These water-soluble materials may be used in their crude condition for a number of purposes although they are preferably concentrated to about 50–55% by weight of solids before using. Such concentrated aqueous solutions are sold under the trade-mark "Masonex." The dried water-soluble material, ordinarily in powdered form, is sold under the trade-mark "Masonoid." As hereinbefore stated, only a minor proportion of the water-soluble material consists of lignin and gums. The major proportion thereof, which is of a carbohydrate nature, consists of an oligosaccharide mixture containing primarily mannose, arabinose, galactose, glucose, and xylose sugar units. Frequently, in the commercial manufacture of the water-soluble material, the aqueous mixture is filtered prior to concentration and/or drying. Most of the gums and lignin are thereby removed inasmuch as these materials constitute the larger proportion of the suspended constituents. In the following description of the invention, the term "water-soluble material" refers to both filtered and unfiltered water solubles and the starting material of the invention may therefore contain a greater or lesser amount of lignin and gums.

Briefly, the present invention stems from the discovery that the above described water-soluble material may be converted, by means of a suitable heat treatment, into an improved mold coating composition. The heat treated product, principally because of the removal of the more volatile constituents of the raw material, and possibly because of some degree of polymerization, is insoluble in water and in most of the ordinary organic solvents. It is thermoplastic in nature, softening at the temperatures normally employed in the coating of metal molds, i. e. temperatures of about 500° F. or more. It is readily dispersed in water when in the form of discrete particles, and is therefore easily applied to mold cavity surfaces from water suspension by dipping, washing, spraying, and the like methods of application.

The heat treatment of the water-soluble starting material may be carried out in any suitable apparatus such as, for example, by heating in an oven, mold, or the like apparatus. Preferably, the heat treatment is carried out at temperatures ranging from about 325° F. to about 530° F. Temperatures lower than 325° F. are unsuitable in that the heating period is thereby extended to undesirable lengths. Temperatures substantially in excess of about 530° F. may be employed where desired and within certain limits. For example, temperatures of from 850° F. to about 1000° F. may be employed over extremely short heating periods such as from a few minutes to substantially momentary. Within the preferred temperature range, the heat treatment is preferably effected over a period of time within the range of from about 0.5 hour to about 20 hours. Obviously, a shorter heat treating period is required at the higher temperatures and, conversely, a longer heat treating period is necessary at the lower limits of the temperature range. Similarly, a thin layer of water-soluble material may be more readily heat treated than a relatively thick cake. In any event, whatever conditions are employed, the heat treatment is continued for a period of time sufficient to provide a yield of about 50% to about 75% of product based on the weight of the starting material. Yields within this range are representative of the thermoplastic product which is best adapted for use as a mold coating composition. Subsequent to the heat treatment the product, which is ordinarily in the form of a fused cake, is subjected to comminution as by rod milling, ball milling, or the like treatment to reduce the material to discrete particles. The powdered product is then ready for use in coating the cavity surfaces of metal molds employed in the production of high melting point metals. When applied to such molds from water or other suitable suspension, ordinarily at mold temperatures in excess of 500° F., the coating composition of the present invention forms a thin, uniform, tough film over the mold surfaces. The film is characterized by its freedom from blisters and the like imperfections which ordinarily contribute to the formation of rough surfaces on the finished cast articles.

The invention will be described with greater particularity by the following specific examples. It is to be understood, however, that the examples are given for illustrative purposes alone, the invention being limited only by the scope of the appended claims.

*Example 1*

500 parts of dry water-soluble material was placed in an enclosed mold and heated (between the platens of a hydraulic press). After the center of the dry material reached a temperature of 337° F., the heat treatment was continued at this temperature for 15.5 hours. Thereafter, the material was allowed to cool and the fused cake was removed from the mold. The yield of heat treated product was 74.1% based on the weight of starting material. The product was rod milled for 1.5 hours. The resulting powder was prepared as an aqueous suspension containing 35% solids. Polished steel rods, heated to temperatures of 550° F. and 600° F., were then dipped for 10 seconds in the aqueous suspension. The heated rods, containing a coating of the suspended material were placed on a heated plate. The coating solidified within about 3 minutes to form a uniform, tough, smooth film on the rods. Comparative tests were carried out employing aqueous solutions of ordinary cane sugar. These samples required more than 10 minutes to dry to a non-tacky condition in which the resultant films were less uniform and much less resistant than those films obtained with the product of the present invention.

*Example 2*

500 parts of dry water-soluble material was heated in a press using 350 pounds steam pressure for 4¾ hours, the center reaching a maximum temperature of 446° F. Subsequent to the heat treatment, the fused product, about 60.5% by weight of the starting material, was rod milled for 1.5 hours. Thereafter, the material was tested as a mold coating composition according to the procedure of Example 1. The films obtained on the heated steel rods were entirely satisfactory in every respect.

*Example 3*

500 parts of dry water-soluble material was heated in an enclosed mold, as in Example 1, for 2.5 hours, the center reaching a maximum temperature of 527° F. The yield of product was 55.8% of the original weight of water-soluble material. After being rod milled for 2 hours the powdered product was tested as in Example 1. The films obtained on the heated steel rods were exceptionally uniform, tough, and dried to non-tacky condition in 2 minutes.

*Example 4*

500 parts of dry water-soluble material was heated in an electric oven for 50 minutes at the temperature of 475° F. Thereafter, the fused product, about 61% by weight of the starting material, was rod milled to a fine powder. The powdered material was then tested as a mold coating composition according to the procedure of Example 1. The films obtained were completely satisfactory.

*Example 5*

An aqueous solution containing 500 parts of water-soluble material (about 55% solids) was heated in an electric furnace for 3 hours at a temperature of 425° F. The fused product was 61.3% by weight of the starting material. The product was rod milled for 1.5 hours to obtain a finely divided material. Mold coating tests were made employing this product and the films obtained were uniformly improved over those obtained with prior art mold coating compositions.

*Example 6*

1000 parts of dry water-soluble material was heated in an electric oven for 20 hours at a temperature of 362° F. 73% by weight of product was obtained based on the weight of starting material. The fused product was rod milled for 1.5 hours after which it was tested as in Example 1. The protective films obtained on the heated steel rods were completely satisfactory.

In all of the foregoing tests, which are representative of the method commonly employed by the industry in testing mold coating compositions, there was a noticeable absence of obnoxious and toxic gases during the drying period. The protective films were also characterized by a progressive gasification during the pouring of steel. Splashing of molten metal was thereby minimized and the ingot yield was consequently greatly improved. It will therefore be appreciated that the present invention provides a method of preparing a novel and improved mold coating composition. The invention presents the advantage of affording a coating composition prepared from cheap raw material, one which is ordinarily a waste product, and therefore presents to the industry a source of material which is of decided economic desirability. The invention further provides the advantage of a mold coating composition which does not emit undesirable gases during its use and which, at the same time, affords a mold cavity coating film presenting decided improvements over those heretofore available to the art.

We claim:

1. A method of preparing a mold coating composition which comprises heating an oligosaccharide mixture consisting essentially of mannose, arabinose, galactose, glucose, and xylose sugar units at a temperature within the range of from about 325° F. to about 530° F., continuing the heat treatment for a period of time sufficient to partially decompose the oligosaccharide mixture and to result in a yield of about 50% to about 75% of product based on the weight of starting material, and thereafter comminuting the product to discrete, water-suspendible particles.

2. A method of preparing a mold coating composition which comprises heating an oligosaccharide mixture consisting essentially of mannose, arabinose, galactose, glucose, and xylose sugar units at a temperature within the range of from about 325° F. to about 530° F. for a period of time within the range of from about 0.5 hour to about 20 hours to provide a yield of about 50% to about 75% of product based on the weight of starting material, and thereafter comminuting the product to discrete water-suspendible particles.

3. In the coating of metal mold cavity surfaces the improvement which consists in providing the mold surfaces with a coating consisting of the residue obtained by heating an oligosaccharide mixture consisting essentially of mannose, arabinose, galactose, glucose, and xylose sugar units at a temperature within the range of from about 325° F. to about 530° F. for a period of time sufficient to result in a yield of about 50% to about 75% of product based on the weight of starting material, thereafter comminuting the product to discrete water-suspendible particles, preparing a water suspension thereof containing from about 30% to about 50% of solids, and then applying said suspension to the surfaces of a heated metal mold.

4. A method of preparing an improved mold coating composition which comprises heating at a temperature within the range of from about 325° F. to about 530° F. the water-soluble material obtained from thermally hydrolyzed lignocellulose, continuing the heat treatment for a period of time within the range of from about 0.5 to about 20 hours and thereby to result in a yield of about 50% to about 75% of product based on the weight of starting material, and thereafter comminuting the product to discrete, water-suspendible particles, whereby there is produced a thermoplastic water-insoluble mold coating composition.

5. A method of preparing an improved mold coating composition which comprises heating at a temperature within the range of from about 325° F. to about 530° F. the water-soluble mixture obtained from thermally hydrolyzed lignocellulose, continuing the heat treatment for a period of time sufficient to partially decompose said water-soluble mixture and to result in a yield of about 50% to about 75% of product based on the weight of starting material, and thereafter comminuting the product to discrete particles whereby there is produced a thermoplastic water-insoluble mold coating composition.

6. An improved mold coating composition consisting essentially of the residue obtained by heating the water-soluble material obtained from thermally hydrolyzed lignocellulose at a temperature within the range of about 325° F. to about 530° F. for a period of time sufficient to result in a yield of about 50% to about 75% of product based on the weight of starting material, and thereafter comminuting the product to discrete water-suspendible particles.

7. An improved mold coating composition consisting essentially of the residue obtained by heating an oligosaccharide mixture consisting essentially of mannose, arabinose, galactose, glucose, and xylose sugar units at a temperature within the range of from about 325° F. to about 530° F. for a period of time sufficient to result in a yield of about 50% to about 75% of product based on the weight of starting material, and thereafter comminuting the product to discrete water-suspendible particles.

8. A method of preparing an improved mold coating composition which comprises heating at a temperature within the range of from about 325° F. to about 530° F. the water-soluble mixture obtained from thermally hydrolyzed lignocellulose, consisting essentially of an oligosaccharide mixture containing primarily mannose, arabinose, galactose, glucose, and xylose sugar units, continuing the heat treatment for a period of time sufficient to remove therefrom substantially all of the material volatile within the said temperature range and to result in a yield of about 50% to about 75% of product based on the weight of starting material, and thereafter comminuting the product to discrete particles whereby there is produced a thermoplastic water-insoluble mold coating composition.

References Cited in the file of this patent

UNITED STATES PATENTS

| | | |
|---|---|---|
| 1,871,324 | Kauffman | Aug. 9, 1932 |
| 1,955,936 | Wallace | Apr. 24, 1934 |
| 2,224,135 | Boehm | Dec. 10, 1940 |
| 2,234,152 | Archer | Mar. 4, 1941 |
| 2,549,822 | Koonce | Apr. 24, 1951 |